United States Patent Office 3,328,228
Patented June 27, 1967

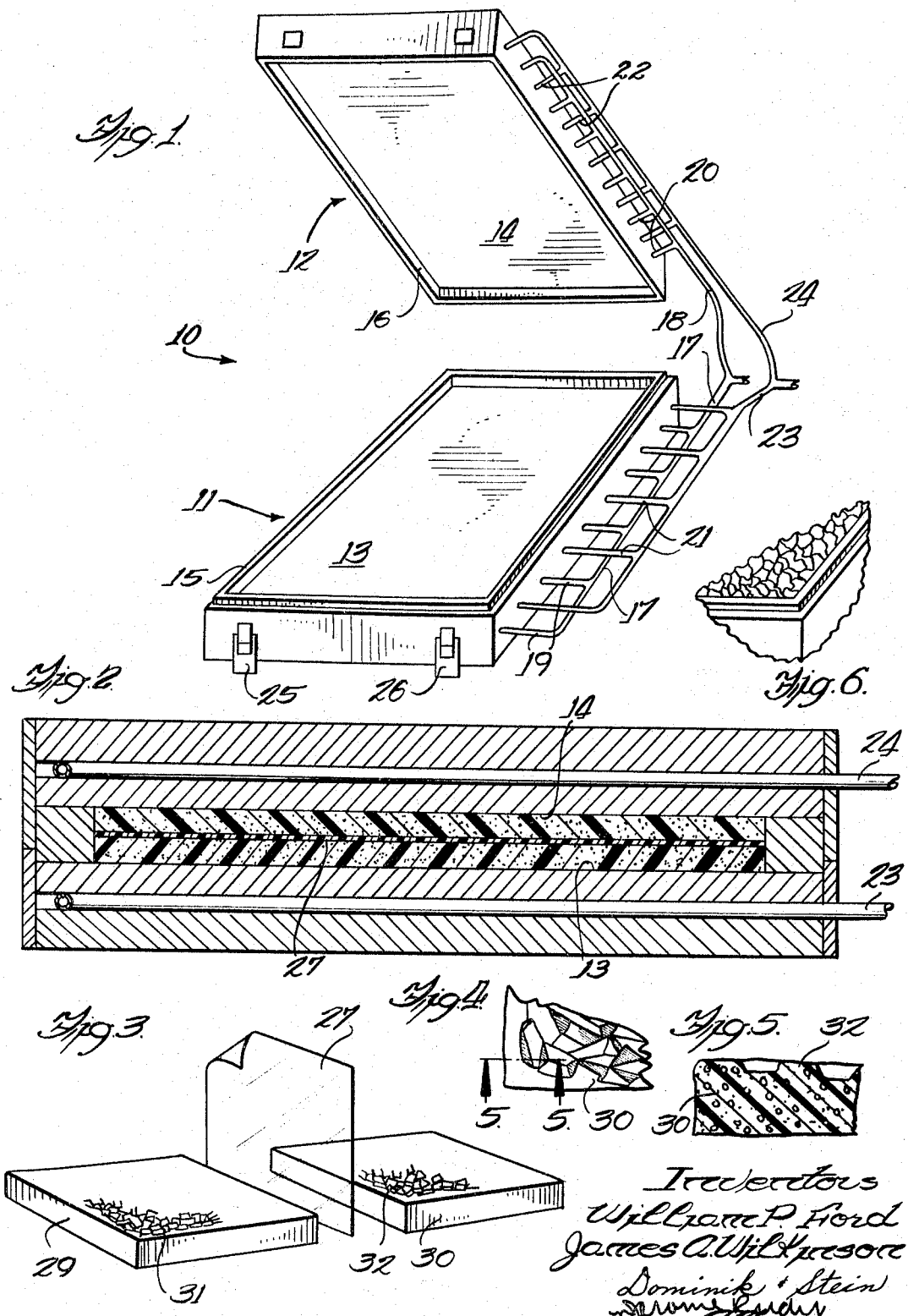

3,328,228
INSULATIVE DECORATIVE WALL AND CEILING BOARD AND METHOD FOR PRODUCING SAME
William P. Ford, Lake Jackson, and James A. Wilkinson, Freeport, Tex., assignors to The Dow Chemical Company, Midland, Mich., a corporation of Delaware
Filed June 11, 1964, Ser. No. 374,513
5 Claims. (Cl. 161—119)

This invention relates to novel foamed polymer wall or ceiling board having a multi-faceted, glossy surface and to a method and apparatus for producing said board. More specifically, this invention relates to the molding of a plurality of wall or ceiling boards of expandable plastic beads or particles in a heated mold. The boards are separated during the molding process by a thin polish sheet so that during the molding operation, the surface beads of one board can bear through the polish sheet against the surface beads of the adjacent board to automatically create a desired, irregular, and highly attractive surface configuration, as the beads expand.

It is well known in the building trade to make board for walls or ceilings out of expandable plastic. The trade usually laminates such material to a thin sheet of metal or wood during molding to provide a decorative effect on one surface of the board. Lamination is undesirable because it adds to the expense of making wall or ceiling board. An alternative procedure used, involves coating the board, after its formation, with paint or lacquer, but this necessitates that considerable care be taken with the selection of the paint. It must not contain a solvent that will attack the plastic to any considerable extent and it must not be too absorbable by the board.

An object of this invention is to provide a novel wall and/or ceiling board.

Another object is to provide a wall or ceiling board which has a unique surface configuration thereon capable of being painted or sprayed.

A further object is to provide a wall and/or ceiling board of very low density foam plastic.

A still further object is to provide a novel method for making such a novel wall and/or ceiling board.

Another object is to provide a method which is relatively fast and simple.

Another object is to provide a method which can be practiced with currently available molding apparatus.

Other objects of the invention will in part be obvious and will in part appear hereinafter.

In accordance with this invention, it has now been found that a glossy, reflective finish can be imposed upon the surface of a foamed polymer board during molding by exposing one surface against the surface of another board, using a polish sheet between them. It is preferred that the expansion of the foamed polymer be at a maximum to obtain the best insulating value consistent with desired strength, and the most pronounced decorative effect. To this end, a sectional mold, capable of being heated is used. Particulate or bead plastic material such as polystyrene, styrene-acrylonitrile polyethylene, and polypropylene is placed into the mold with a thin, non-adherent plastic film, such as polyethylene, polypropylene, cellophane, polyethylene terephthalate and the like, between two or more layers of particulate material. The mold is then heated to form a plurality of wall or ceiling boards at the same time. The thin film serves as an interfacial polish sheet which, being flexible, conforms to the surface of the beads with which it is in contact. As foaming occurs by the application of heat to the mold, a homogenous, cellular body is formed with there being substantially no interstitial space between the particles of each section.

As should be apparent, the two surfaces adjacent to but on opposite sides of the polish sheet will conform to each other in a complementary manner with the expandable beads or particles on each side of the polish sheet serving as a mold for the cellular body being formed on the other side. The beads or particles adjacent the interface are prevented from forming rounded or spherical surfaces by their effective, though not actual contact, through the polish sheet. A multi-faceted, glossy surface on each wallboard section in place of the multi-spherical pattern had the expansion at the surface been unimpeded is therefore formed. In some instances, such as with polystyrene beads and polyethylene sheet, small flats are formed on each bead surface at each effective point of contact, thus creating a most eye pleasing effect.

It is desired that the expansion of the plastic beads or particles be at a maximum to obtain optimum insulating and strength values. It is therefore desirable to prefoam the beads or particles so that the bulk density of the prefoamed beads substantially equals the desired final density of the tile. This prefoaming may be done by exposure to radiant heat, hot air, hot water, or steam, resulting in the beads being expanded, for polystyrene, for example from a density in the range of 35 to 40 pounds per cu. ft. to a density within the range of 1.0 to 10.0 pounds per cu. ft.

The apparatus utilized comprises two mold sections between which the polish sheet may be positioned. The sections contain heating means to facilitate heating of the mold.

The invention accordingly comprises the several steps and the relation of one or more of such steps with respect to each of the others, the apparatus embodying features of construction, combination and arrangement of parts which are adapted to effect such steps, and the product which possesses the characteristics, properties and relation of elements, all as exemplified in the detailed disclosure hereinafter set forth, and the scope of the invention will be indicated in the claims.

For a fuller understanding of the nature and objects of the invention, reference should be had to the following detailed description taken in connection with the accompanying drawing, in which:

FIGURE 1 is a perspective view of a sectional mold of the type that may be employed in conjunction with this process;

FIGURE 2 is a cross-sectional view of the mold arrangement showing the general manner in which the foamed sections are disposed in the mold, being separated by the polish sheet;

FIGURE 3 is a view of complementary wallboard sections viewed after removal of the polish sheet, thus revealing the resulting surfaces;

FIGURE 4 is a top view of the surface on a portion of one of the wallboard sections; and FIGURE 5 is a sectional view, taken along lines 5—5 of FIG. 4.

FIGURE 6 illustrates a part of a mold wall with an irregular surface.

Similar reference characters refer to similar parts throughout the several views of the drawing.

Turning to FIGURE 1, a heated mold 10 is shown constituted by lower mold section 11 and upper mold section 12. The lower platen 13 of section 11 is to receive the expandable bead material, with upper platen 14 of section 12 being arranged to define with the lower platen a mold cavity of the proper configuration for the bead expansion procedure. Mold frame 15 defines the outer peripheral surface of the mold cavity, with the peripheral edge 16 of upper mold section 12 being designed to reside just outside the edges of the mold frame when the mold sections have been brought together, this latter detail being better seen in FIGURE 2.

In order that the mold sections can be heated after being placed in assembled relation, a header 17 is provided for the application of heat to the lower mold section, to which are connected a number of small tubes or pipes 19 by means of which the heated medium may be circulated through the mold. Return tubes 21 are responsible for returning the medium to return header 23 so that the medium can be again heated and recirculated. Similarly, header 18 supplies heat through pipes 20 to upper mold section 12, with return tubes 22 being responsible for recirculating the return fluid to return header 24 for passage to the heat source for the purpose of reheating.

When the mold halves have been placed in interfitting relation as shown in FIG. 2, clamping means such as shown at 25, 26 in FIG. 1 are clamped together around the several sides of the mold so that the mold sections will be locked securely in the proper relationship.

In the typical practice of the process, plastic beads or particles sufficient to partially fill the lower half of the mold are placed on the platen 13 and spread evenly. Any moldable polymer, such as the above-mentioned polymers, which can be made into an expanded bead or particle may be employed. A sheet of film 27, typically one-half mil (.0005 in.) thick, is then placed over the layer of bead material and thereafter a similar amount of bead material is placed upon this film or polish sheet. Thereafter, the upper section of the mold is set in place and heat is then applied such as by circulating steam or other heated fluid through the headers 17 and 18.

As seen in FIGURE 2, the expandable bead material is disposed between lower platen 13 and upper platen 14, with polish sheet 27 shown disposed between the two portions of material and mold frame 15 shown defining the peripheral contour. The bead material is caused to expand upon the application of heat through pipes 17 and 18 until such time as the surface beads of one portion of material are in firm contact with the beads of the other portion of material.

Typically the assembly is heated for about 25 minutes and thereafter cooled for about 5 minutes. The mold is then dismantled and the expanded foam material is removed and trimmed to desired size on a band saw or the like. The material is thereafter split along the line of demarcation represented by the polish sheet, thus making two tiles or wallboard sections. It should be borne in mind that the conditions of temperature, time, and, of course, the pressure in the mold as determined by the amount of material utilized, are a function of the particular polymer beads or particles used and/or the type of wallboard being made, as will be apparent to one skilled in the art.

Turning to FIGURES 3–5, a pair of wall or ceiling boards 29 and 30 are shown shortly after their separation from the polish sheet. As can be best seen in FIGS. 4 and 5 which are a top view of a portion of the board 30 and a section through it, respectively, a multi-faceted surface 32 is provided. As will be apparent, the surface 31 of the board 29 is the mirror image of the surface 32 inasmuch as in the mold, each surface formed the pattern for the other. The surfaces are therefore complementary.

Reference is now made to a specific example which illustrates the manufacture of ceiling tile.

EXAMPLE

The lower section of a mold similar to that shown in FIG. 1 but designed for the desired thickness and width of ceiling tile is approximately half filled with prefoamed expandable beads of polystyrene and spread evenly. A polish sheet of polyethylene 0.5 mil thick is then placed on top of the beads, and a second layer of prefoamed expandable polystyrene beads is placed on top of the polish sheet. The mold top, is then set in place, and the mold bottom and top locked together. It is then heated to a temperature of 212 to 220° F., which temperature is maintained for 15 to 30 minutes with steam. After the flow of steam has been stopped, the assembly is allowed to stand for 5 to 8 minutes, after which time, cooling water is introduced into the coils. This is continued for 8 to 10 minutes. The mold is opened and the formed ceiling tiles removed and separated at the interface.

As will be apparent to those skilled in the art, the above-described method of fabrication is not the only manner in which the desired surface can be achieved, i.e. a surface containing a multiplicity of irregular, flat, glossy surfaces. For example, as seen in FIG. 6, a mold may be used in which the polish sheet is placed between a layer of beads and a metal form specially molded or machined to give the desired irregular surface, or in other words instead of two bead surfaces expanding against one another through the polish sheet, one bead surface expands against a special metal mold through the polish sheet. If the metal mold is properly shaped, this method will also produce the irregularly oriented, flat glossy faceted surface described hereinabove.

Although for convenience this invention has been described by reference to the manufacture of flat board stock, it must be borne in mind that the form of the mold could very well be such as to produce a gross shape entirely different from the flat stock that is usually desired for ceiling or wall.

As to the polish sheet, any material which is not substantially deformed by heat and which does not adhere to the surface of the expanded polymer beads is useful. A sheet of 0.5 mil polyethylene is preferred since it gives excellent release, high gloss, and good conformation. However, polyethylene of one to ten mil thickness, can also be used since it also gives good release and good conformation. In some instances, low gloss, which may be desirable in certain instances, can be effected by using polyethylene of different gloss characteristics. For example, polyethylene of 12 gloss gives very low gloss while polyethylene of 72 gloss gives very high gloss.

It will thus be seen that the objects set forth above, among those made apparent from the preceding description, are efficiently attained, and since certain changes may be made in carrying out the above process, in the described product, and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. As articles of manufacture, a pair of separable boards formed of fused expanded foam plastic particles, said boards having a surface with a complementary multi-faceted configuration between them as a result of the use of a polish sheet of thin non-adherent plastic film between them during expansion and fusion of said plastic particles in a heated mold.

2. A method for producing a multi-faceted, glossy surfaced insulating foam plastic board comprising the steps of expanding and fusing foamable plastic particles in layers interstitially separated by a thin flexible non-adherent plastic film, and thereafter separating said layers at the line of demarcation represented by said film to form said board.

3. The method of claim 2 wherein said plastic particles comprise beads of polystyrene.

4. A method for forming tiles of heat-expandable plastic particulate material and producing a surface thereon which has a multi-faceted glossy appearance by the use of a mold capable of being heated comprising the steps of placing such expandable material in one portion of the mold, covering the material with a polish sheet of thin non-adherent plastic film, placing additional expandable material above said polish sheet, closing the mold and applying heat thereto to cause foaming and fusing of said material together on each of the opposite sides of said polish sheet, thereafter removing said foamed and fused material from the mold and separating it at the line of demarcation represented by said polish sheet to form said tiles.

5. A method for making two multi-faceted glossy surfaced boards from expandable plastic particulate material in a mold capable of being heated comprising the steps of filling approximately one-half of the mold with said expandable plastic particulate material, covering the material with a thin polish sheet, applying a similar amount of particulate material upon the polish sheet, closing the mold, applying heat for a length of time sufficient to substantially fully expand and to fuse together the expandable particulate material, and thereafter removing the material and separating it at the line of demarcation represented by thet polish sheet to form said boards.

References Cited

UNITED STATES PATENTS

| | | | |
|---|---|---|---|
| 1,931,018 | 10/1933 | Calkins | 264—297 |
| 1,958,184 | 5/1934 | Cross | 264—338 XR |
| 2,431,720 | 12/1947 | Willey. | |
| 2,629,135 | 2/1953 | Johnson | 264—255 XR |
| 2,673,371 | 3/1954 | Uhlig | 264—338 XR |
| 2,678,293 | 5/1954 | McMillan et al. | 264—54 XR |
| 2,690,594 | 10/1954 | Kirksey | 52—144 XR |
| 2,787,809 | 4/1957 | Stastny | 264—53 |
| 2,954,838 | 10/1960 | Nuorivaara | 52—144 XR |
| 3,054,146 | 9/1962 | Griffin | 264—51 XR |
| 3,080,938 | 3/1963 | Grohmann. | |
| 3,106,983 | 10/1963 | Karpovich et al. | |
| 3,256,121 | 6/1966 | Abell | 156—247 XR |

ALEXANDER H. BRODMERKEL, *Primary Examiner.*

DANIEL J. ARNOLD, *Examiner.*

P. E. ANDERSON, *Assistant Examiner.*